Patented June 14, 1932

1,863,375

UNITED STATES PATENT OFFICE

COULTER W. JONES, OF McDADE, LOUISIANA, ASSIGNOR TO THE DOW CHEMICAL COMPANY, OF MIDLAND, MICHIGAN, A CORPORATION OF MICHIGAN

METHOD OF MAKING BROMIDES

No Drawing.    Application filed June 3, 1929. Serial No. 368,197.

My invention relates to methods of making bromides, and has particular regard to the preparation of potassium bromide.

The usual method for making potassium bromide, taking the latter as an example of metallic bromides in general, consists in absorbing bromine in an aqueous solution of potassium hydroxide or carbonate. The chemical reaction involved is expressed by the Equations (1) and (2), wherein the hydroxide and carbonate, respectively, are employed:

(1) $6KOH + 3Br_2 \rightarrow 5KBr + KBrO_3 + 3H_2O$
(2) $3K_2CO_3 + 3Br_2 \rightarrow 5KBr + KBrO_3 + 3CO_2$ The product contains theoretically 1 mole bromate to 5 moles bromide, although in practice the proportion of bromide obtained is usually somewhat greater than the theoretical amount. The presence of bromate in the product is not always desirable, and its formation during the operation of the process is often objectionable, leading to operating difficulties.

In commercial operations for making potassium bromide, economic considerations normally compel the direct utilization of a dilute mixture of bromine with air or other gas or vapor instead of liquid bromine or a concentrated vapor thereof, for reacting with the alkaline potash solution. The absorption is most conveniently carried out in a tower, or series of towers, filled with suitable packing material in which the bromine-laden air is passed in counter current or parallel current with the aforesaid solution. The solution is continuously recirculated over the tower until a sufficient concentration of bromide and bromate is built up therein, whereupon it is drawn off and replaced by a fresh alkaline solution. It is obviously desirable to produce as concentrated a solution as possible in order to reduce evaporation costs in working it up for the preparation of the salt crystals. However, potassium bromate has only a limited solubility in water, which is somewhat further diminished in a solution of potassium bromide. Consequently, during the conduct of the process, it is essential that the total concentration of dissolved salts in the absorbing solution be kept below the point at which potassium bromate, the least soluble salt present, begins to crystallize. Otherwise the formation of the crystals in the interstices of the tower packing obstructs the passage of the reacting gases and solution therethrough and may eventually lead to a complete stoppage of the operation.

It has been found that under conditions of normal operation during the summer months, when the temperature of the solution customarily varies between about 40° and 50° C., a concentration of dissolved salts corresponding to a gravity of about 10° Bé. can be attained in the solution without any material deposition of potassium bromate crystals. During the winter months, however, the lower temperatures prevailing necessitate the use of a more dilute alkali solution and withdrawing the solution when a materially lower concentration has been reached in order to avoid crystallization of bromate. The process is, therefore, at such times burdened with an added steam cost, either to cover the evaporation of a more dilute solution or for heating the absorbing solution to a point approximating the summer operating temperature.

I have now found that the aforesaid disadvantage may be avoided in a simple and practical manner by the addition of ammonia to the absorbing solution. The invention, then, consists of the steps hereinafter fully described and particularly pointed out in the claims, the following description setting forth in detail certain procedure whereby the principle of the invention may be used.

In the present process, when employed specifically for the production of potassium bromide, a solution of potassium carbonate is utilized as the primary absorption medium. Such solution is initially capable of dissolving only a relatively small amount of bromine, the latter, of course, promptly reacting with the potassium carbonate in accordance with the equation previously given. As the concentration of the potassium bromide product increases in the solution, however, the solubility of bromine therein is materially increased, and with continued operation an excess of bromine may at times be present locally in the solution flowing through the tower. Now, if ammonia is added to the aforesaid solution, it reacts with the excess of bromine present in accordance with Equation (3):

(3) $8NH_4OH + 3Br_2 \rightarrow$
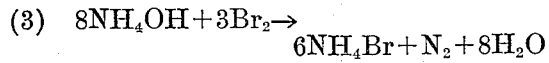
$6NH_4Br + N_2 + 8H_2O$

The product of the latter reaction contains no bromate. When such product intermixes with the solution containing potassium carbonate, by metathesis ammonium bromide is converted to potassium bromide and ammonium carbonate is formed. The latter can then react with bromine in the same way as ammonia, thereby forming a further quantity of ammonium bromide, the latter in turn being transformed to potassium bromide as just described. The cycle is repeated continuously in the absorbing solution as long as ammonia, ammonium carbonate or other ammonium compound reactive with bromine remains therein, the latter compounds serving in the capacity of carriers for bromine which effect the conversion thereof to potassium bromide without the accompanying formation of bromate. Such mode of operation, therefore, has the effect of restraining or limiting the formation of bromate in the process, and by suitable regulation of the quantity of ammonia added, the concentration of bromate in the product may be controlled to any desired degree and maintained below the point where crystallization occurs, without necessity for increasing the dilution of the solution, regardless of temperature or climatic conditions. The ammonia may be added to the absorbing solution in any suitable way, either as vapor or a solution thereof, and at any convenient point in the absorption system. I have found, however, that such addition is made most advantageously by introducing an aqueous ammonia solution in regulated amount on the intake side of the circulating pump for handling the absorbing solution. I may also, if desired, replace the ammonia solution wholly or in part with a solution of ammonium carbonate or other ammonium compound reactive with bromine.

The principal advantages to be gained by means of my improved method or process are: (1) Plant operation may be conducted independently of atmospheric temperature without need for artificial heating during cold weather; (2) the gravity or concentration of the bromide solution produced may be maintained approximately constant throughout the year; (3) plugging or stoppage of the absorption tower by deposition of bromate crystals is avoided when operating during cold weather; (4) a product is obtained having a lower content of bromate than under usual mode of conducting the process.

Obviously the production of bromate in a process of the present character might be avoided altogether, if the absorption of bromine were carried out entirely by reaction with ammonia as expressed in Equation (3), the ammonium bromide initially produced in this way being subsequently converted to potassium bromide or any other desired bromide by treatment with a solution of the hydroxide or carbonate of the corresponding metal. Such mode of operation, however, would suffer from the disadvantage that the use of a relatively costly intermediate material, ammonia, adds expense to the process, not only for the added material consumed in the initial step but also for the recovery of ammonia liberated in the second step. My invention, on the other hand, contemplates retaining the use of the cheaper alkaline hydroxide or carbonate as the principal absorption agent, but combining therewith the addition of a subordinate amount of ammonia just sufficient to regulate the concentration of bromate in the product at the desired point to prevent the latter from crystallizing out. Such quantity of ammonia is substantially completely consumed in the process so that no additional expense for the recovery of an excess thereof need be incurred.

While the foregoing description refers more specifically to operation with a solution of potassium carbonate, the condition is analogous when a solution of potassium hydroxide is employed, and similar advantages accrue thereto by applying my improved mode of procedure. The invention likewise may be applied for the production of other bromides, more particularly of the alkali and alkaline earth metals, although with somewhat less advantage when the corresponding bromate has a greater solubility in water than that of potassium bromate.

Other modes of applying the principle of my invention may be employed instead of those explained, change being made as regards the process herein disclosed, provided the means stated by any of the following claims or the equivalent of such stated means be employed.

I therefore particularly point out and distinctly claim as my invention:—

1. A process of making an alkali metal bromide which comprises contacting a current of bromine-laden air with a solution of an alkaline compound of the corresponding metal in the presence of ammonia.

2. A process of making potassium bromide which comprises contacting a current of bromine-laden air with a solution of an alkaline potassium compound in the presence of ammonia.

3. A process of making potassium bromide which comprises contacting a current of bromine-laden air with a solution of potassium carbonate in the presence of ammonia.

4. A process of making an alkali metal bromide which comprises contacting a current of bromine-laden air with a solution containing the bromide and an alkaline compound of the corresponding metal and limiting the formation of bromate by adding ammonia to said solution.

5. A process of making potassium bromide which comprises contacting a current of bromine-laden air with a solution containing potassium bromide and an alkaline potassium compound and limiting the formation of potassium bromate by adding ammonia to said solution.

6. A process of making potassium bromide which comprises contacting a current of bromine-laden air with a solution containing potassium bromide and carbonate and limiting the formation of potassium bromate by adding ammonia to said solution.

Signed by me this 27th day of May, 1929.

COULTER W. JONES.